United States Patent [19]

Coussau et al.

[11] 4,319,961
[45] Mar. 16, 1982

[54] FIXING DEVICE FOR DETACHABLY FIXING A HEATING ELEMENT

[75] Inventors: Jean Coussau, Paris; Daniel Brunaud, Ouroux Saint Germain du Plain, both of France

[73] Assignee: Framatome, Courbevoie, France

[21] Appl. No.: 100,874

[22] Filed: Dec. 6, 1979

[30] Foreign Application Priority Data

Dec. 12, 1978 [FR] France ............................ 78 34944

[51] Int. Cl.³ .............................................. G21C 19/20
[52] U.S. Cl. ..................................... 376/260; 376/307
[58] Field of Search ................. 176/30, 87; 285/4, 14, 285/92, 353, 384; 219/431, 440; 165/31, 39, 109, 114

[56] References Cited

U.S. PATENT DOCUMENTS

| | | | |
|---|---|---|---|
| 2,454,557 | 11/1948 | Jacobson | 285/92 |
| 2,784,015 | 3/1957 | Swanson | 285/14 |
| 3,114,414 | 12/1963 | Judd | 165/31 |
| 3,584,900 | 6/1971 | Lennon et al. | 285/14 |
| 3,618,987 | 11/1971 | Carbone | 285/353 |

*Primary Examiner*—Sal Cangialosi
*Attorney, Agent, or Firm*—Pollock, Vande Sande & Priddy

[57] ABSTRACT

A fixing device for detachably fixing a heating element to a sleeve welded to the body of the pressurizer of a nuclear reactor comprises an assembly of members with a symmetry of revolution, the axes of the members being coaxial with the heating element. The members comprise a gasket-carrying collar made integral with the heating rod and which bears on the outer face of a shoulder on the sleeve, a two-part ring which bears on the inner face of the shoulder on the sleeve, a screw-threaded nut and a screw-threaded tubular collar which are threaded together and bear respectively on the collar and the ring. The nut is provided with an opening for water leaking from the pressurizer and a zone of reduced thickness along which the nut can be cut in the event of seizure of the nut and tubular collar.

1 Claim, 1 Drawing Figure

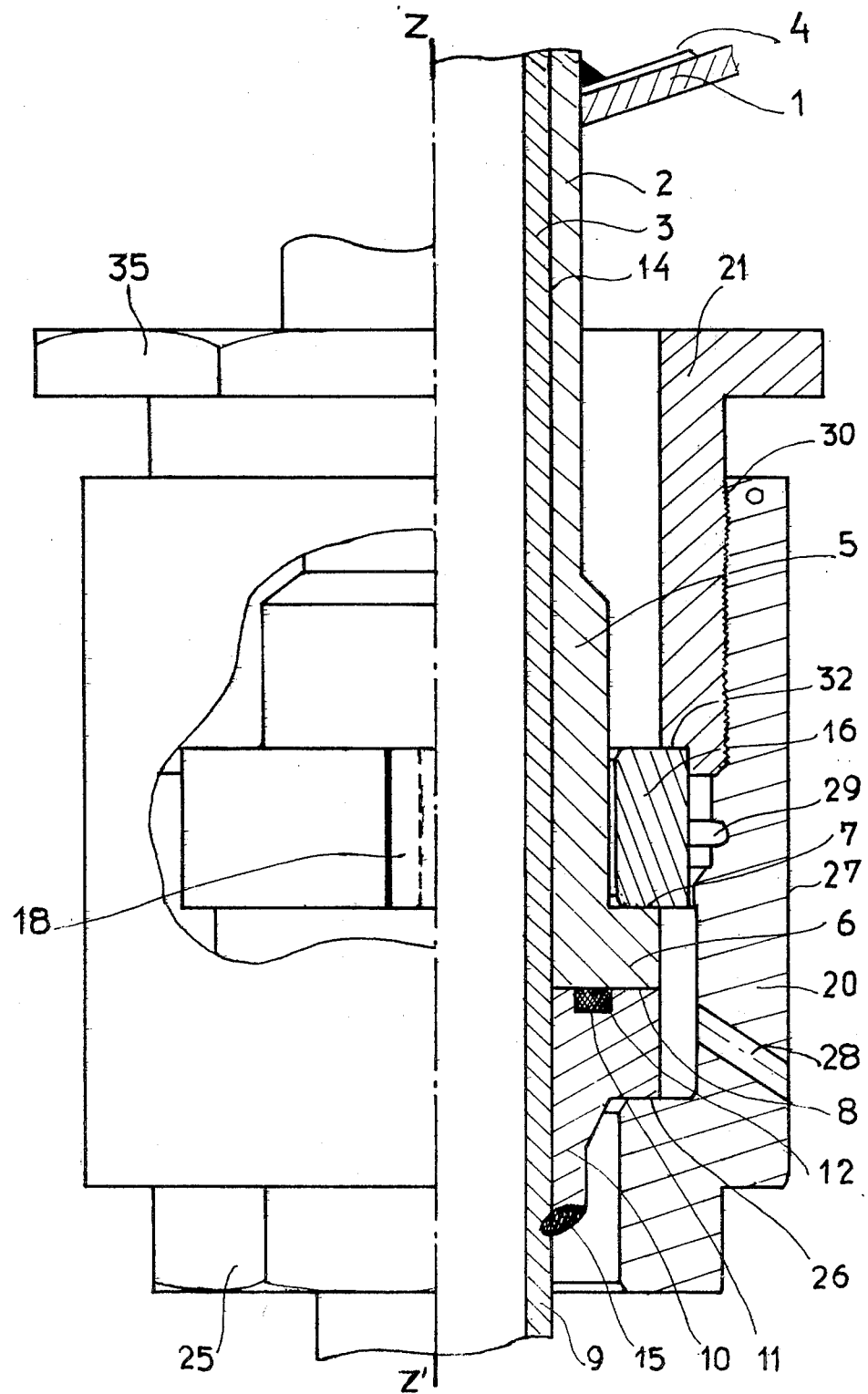

FIXING DEVICE FOR DETACHABLY FIXING A HEATING ELEMENT

The invention relates to a device for detachably fixing a heating element, with an electrical resistance, to the pressuriser, of a nuclear reactor using pressurised water, into which the heating element extends.

In nuclear reactors using pressurised water, it is necessary to have, in the primary circuit, a pressuriser, the function of which is to regulate and restrict the pressure of the water in the primary circuit when changes in the load required by the turbine are likely to cause variations in the temperature and the pressure of the primary fluid.

The pressuriser of a nuclear reactor using pressurised water, is formed by a cylinder which is arranged with its axis vertical and is closed at both ends by hemispherical plates. The heating elements with electrical resistances, which are referred to as heating rods, penetrate through the lower plate into the pressuriser so as to heat the water in the primary circuit by the Joule effect, whilst the water resides in the pressuriser, in order to re-establish the temperature and the pressure of the primary water, since the temperature and pressure may tend to drop during certain stages in the running of the reactor and of the turbine.

The upper hemispherical plate generally has an opening which permits the introduction of a nozzle for spraying water in order to cool the primary water and to condense steam above the filling level of the pressuriser, and also comprises one or more pipes placing the interior of the pressuriser in communication with safety valves for expansion of the primary fluid.

Thus, the pressuriser makes it possible either to increase or to reduce the pressure of the primary fluid, according to the stages in the running of the reactor and of the turbine.

The lower hemispherical pressuriser plate has a fairly large number of holes distributed over several concentric circles. Tubular sleeves for the heating rods and which enable the heating rods to pass through the plate into the pressuriser extend through these holes and are fixed by welding to the lower plate. The heating rods are produced in the form of tubular sheaths which enclose the heating resistances made of nickel/chrome alloy, which resistances are wound around solid copper cores. The insulator used in the manufacture of the heating rods is magnesia.

Each heating rod is arranged inside a sleeve so as to penetrate vertically into the pressuriser, and the tubular envelope forming the sheath of the heating rod is arranged coaxially with the tubular sleeve with a very small clearance, with the result that the sleeve holds the heating rod inside the pressuriser.

In order to fix the tubular sheath of the heating rod to the sleeve, the tubular sheath is welded to the end of the sleeve over its entire periphery. The join is thus perfectly leaktight.

This welding is generally carried out on a reinforced part of the sleeve or on a joining piece which is itself welded to the sleeve before the latter is placed in the pressuriser.

However, this type of fixing, which is totally satisfactory as regards the strength and the leaktightness of the joint formed, has disadvantages which are related to the facts that it is difficult to remove a heating rod which would need to be replaced after a certain operating period, that the replacement of a used rod by a new rod which must be welded to the sleeve is itself difficult to carry out, and that the checking of the welds between the heating rods and the sleeves in an extremely difficult operation to carry out.

To overcome these disadvantages, it has been proposed to have easily removable heating rods inside closed tubes penetrating into the pressuriser, which tubes are referred to as glove fingers, the leaktightness of the pressuriser being achieved by means of these glove fingers, which do not have an opening bringing the inside of the pressuriser into communication with the outside. Devices of this type have been used on shipborne reactors such as the nuclear reactors used on submarines. However, in the case of reactors of very high power, the disadvantage of this arrangement is that the electrical power of the heating rods must be much greater than the minimum power necessary for regulating the temperature and the pressure of the primary water in the cooling circuit of the reactor, because the heat exchange between the primary water and the heating resistance takes place across the glove fingers and this prohibits direct contact between the water in the primary circuit and the heating resistance.

Furthermore, devices for fixing elements penetrating into an enclosure are known, which devices comprise two fixing members which screw onto one another. However, these devices cannot be used in the case of an enclosure under high pressure and do not make it possible easily to remove the element in the case where the threads of the screwed members have seized up.

It is an object of the invention to provide a device for detachably fixing an elongate heating element, with an electrical resistance, which extends into the pressuriser of a nuclear reactor using pressurised water for heating the water in the primary circuit thereof and for keeping the water at constant pressure, the heating element extending inside a tubular sleeve which passes in a leaktight manner through the wall of the plate of the pressuriser, that end of the sleeve which is located outside the pressuriser being provided with a shoulder having two bearing faces extending perpendicular to the axis of the sleeve, the inner one of the bearing faces being directed towards the pressuriser, and the outer one of the bearing faces being directed outwardly thereof, said fixing device comprising an assembly of members having a symmetry of revolution and axes coaxial with the axis common to the sleeve and to the heating rod, said members of said assembly comprising:

a collar which is adapted to be made integral with that end of the heating rod which is located outside the pressuriser, said collar having an inner face for bearing on the outer face of the shoulder of the sleeve with the interposition of gasket means for ensuring leaktightness between the rod and the sleeve to isolate the inside of the pressuriser from the external environment and an outer face;

a ring made of two identical parts delimited by a plane passing through said axis thereof, said ring being intended to bear on the inner face of the shoulder and having an external diameter which is greater than the external diameter of the shoulder and of said collar;

a nut comprising, from the outer end thereof intended to be located outwardly of the pressuriser to the inner end thereof closer to the pressuriser, a part of small internal diameter, which is bounded by a shoulder intended to bear on said outer face of said collar, a part of larger internal diameter, said diameter being greater than said external diameter of said ring, said part of larger internal diameter having an opening towards the outside for discharging leaking primary water and being arranged to be, in use, at the level of the join between said collar and the sleeve, and a cutting zone having a circumferential groove arranged to be, in use, at the level of said ring, and an internally threaded part; and a tubular collar having on its outer face a thread corresponding to the thread of said internally threaded part of said nut, and an internal diameter which is greater than the external diameter of the shoulder of the sleeve but less than said external diameter of said ring on which said tubular collar is intended to bear.

In order to provide a clear understanding of the invention, an embodiment of a device according to the invention will now be described, by way of example only, with reference to the accompanying drawing.

In the drawing the single FIGURE is a part elevation, part elevated view, with a section through a vertical plane of symmetry, of an embodiment of a device according to the invention for fixing a heating rod to a pressuriser.

The drawing shows the hemispherical lower plate 1 of a nuclear reactor pressuriser at the point where a sleeve 2 for a heating rod, of which the tubular sheath 3 is shown in the FIGURE, passes through the hemispherical plate.

It is seen that the tubular sleeve 2 is welded to the inner surface of the hemispherical plate 1 at a point where the hemispherical plate is provided with a special coating 4 which makes it possible to produce the weld under good conditions.

In the case of pressurisers of the currently constructed nuclear reactors using pressurised water, the number of holes such as that shown in the drawing is of the order of 80. The holes are distributed over three concentric circles and only some of them are provided with heating rods which are actually in use. Some of the holes are provided with replacement heating rods and others are provided with sealing plugs. Only 60 heating rods are used to maintain the pressure and temperature of the primary fluid.

The end of that part of the sleeve which extends outside the pressuriser comprises a section 5 of greater thickness than the inner part of the sleeve, which section 5 terminates in a shoulder 6 providing an inner face 7 directed towards the pressuriser, and an outer face 8 directed outwards. These two specially machined faces permit the bearing of gaskets or pressure rings, as will be described below.

A gasket-carrying collar 10, which is coaxial with the tubular sheath 3 and has a gasket bearing upper face 11, is fixed to the tubular sheath 3. The face 11 is provided with a gasket 12 making it possible, when the tubular sheath is in place, to produce a leaktight join between the upper face 11 of the collar 10 and the outer surface 8 of the shoulder 6 of the sleeve 2.

It is seen that the tubular sheath 3 of the heating rod is introduced into the sleeve 2 with a small radial clearance 14 which makes it possible to introduce and remove the heating rod easily.

The upper end of the heating rod, which contains the electrical resistances and is located inside the tubular sheath 3, penetrates vertically into the pressuriser, up to a certain height, so as to be able to heat the primary water present in the pressuriser by direct contact, whilst the lower part of the tubular sheath 3, extending outside the pressuriser, is fixed in a rigid and leaktight manner to the collar 10 by means of a circular weld 15.

When the fixing device is in place, as shown in the drawing, a ring 16 bears on the inner face 7 of the shoulder 6 at the end of the sleeve 2.

The ring 16 consists of two identical half-rings, the joining plane of which lies in a plane passing through the axis ZZ' common to the sleeve and to the heating rod. When the ring 16 is placed on the face 7 of the shoulder 6, the two parts of this ring are contiguous along two meridian plane surfaces such as the surface 18 shown in the drawing.

The external diameter of the ring 16 is greater than the diameter of the shoulder 6 and of the collar 10.

The fixing device comprises a nut 20 and a threaded collar 21, the screwing of the threaded part of the nut 10 onto the collar 21 fixing the heating rod to the sleeve 2.

The nut 20 comprises a first part 25 of small internal diameter, the external surface of which is in the shape of a hexagon. Part 25 terminates in a shoulder 26 forming the joint between the part 25 of small internal diameter and a part 27 of the nut, of larger internal diameter, which part 27 is located around the collar 10 and the ring 16.

When the nut is screwed on, the shoulder 26 bears on the outer face of the collar 10 so as to apply the collar 10, with pressure, to the gasket 12, and the gasket 12 to the face 8 of shoulder 6 thus ensuring leaktightness between the collar 10 and the shoulder 6 of the sleeve.

The part 27 of larger internal diameter of the nut 20, the diameter of which part is greater than the diameter of the ring 16, is provided with an opening 28, which brings the interior bounded by the nut into communication with the exterior environment, and a groove 29 for facilitating cutting the nut in the event that the nut has seized up.

The opening 28 is located at the level of the joining plane between the collar 10 and the shoulder 6, because it is at this level that the primary fluid, consisting of water containing boric acid, may leak out to fill the space inside the nut 20.

The groove 29, provided in the internal surface of the part 27 of the nut, is located at a level half-way up the ring 16, and the level is marked on the outside of the nut to facilitate the cutting operation.

The upper part of the nut 20 has a tapping 30 which engages on a corresponding thread provided on the external surface of the collar 21.

The internal diameter of the collar 21 is less than the external diameter of the ring 16, on which it bears via a surface 32, but is greater than the external diameter of the shoulder 6 of the sleeve 2 and the external diameter of the collar 10.

When the nut 20 is screwed onto the collar 21, the gasket 12 is applied between the surface 11 and the surface 8 so as to achieve leaktightness between these two surfaces, the sleeve 2 being held against the ring 16 which itself bears against the collar 21 via the bearing surface 32.

It is therefore seen that the introduction and the removal of the heating rod can be carried out very simply by screwing the nut 20 onto the collar 21 and unscrewing it therefrom respectively.

These operations can be carried out with a special tool consisting of a key formed of two concentric tubes, the upper parts of which are appropriately shaped and engage on the polygonal shaped part 25 of the nut 20 and on the polygonal, e.g. octagonal, shaped part 35 of the collar 21 when the tool is positioned for tightening and loosening the assembly which has been screwed together.

Arms which are perpendicular to the axis of the tubes and made fast with the tubes enable tightening and loosening of the assembly by hand. A tightening torque restrictor, which makes it possible to adjust the value of the torque, is associated with one of the two arms. In the case where removal is not possible if the assembly of the nut 20 screwed onto the collar 21 has seized up, the heating rod can nevertheless be removed by cutting the nut 20 at the level of the groove 29, the location of which is marked on the external surface of the nut 20.

When the lower part of the nut 20 has thus been detached from the upper part which remains engaged on the collar 21, it is possible to remove the two-part ring 16 laterally in order to free the collar 21, the internal diameter of which is slightly greater than the external diameter of the shoulder 6 and of the collar 10. Thus, after extraction of the heating rod, which is possible because the lower part of the nut 20 has been detached and separated from the upper part of the nut, it is possible to introduce a new heating rod, provided with a new fixing device, without having to destroy any of the welds and without any removal operation other than that of cutting the nut 20.

Thus, in all cases, with the above described device it is possible to remove a used heating rod and to replace it by a new heating rod.

If leakage of primary water containing boric acid should occur through the clearance 14 between the heating rod and the sleeve 2, this leakage should be stopped at the level of the weld 15 or at the level of the gasket 12. However, if this leakage of water reaches the volume bounded by the nut 20, it can be removed via the opening 28.

It is therefore seen that the main advantages of the above described device are that it permits easy introduction and removal of a heating rod, even if seizure has taken place at the level of the assembly which has been screwed together, and makes it possible to achieve leaktightness of the joint between the heating rod and the sleeve and to carry out effective and leaktight introduction using an extremely simple fixing device comprising a small number of components.

The invention is not intended to be restricted to the embodiment which has now been described; on the contrary, it includes all variants thereof.

Thus, while the device described above and shown in the drawing has a machined gasket bearing surface 11 on the collar 6, it is possible to use another type of gasket intercalated between two plane surfaces, in which case the internal surface 11 of the collar is not provided with a groove for the gasket.

It is also possible to envisage other methods of screwing the nut onto the collar, and to envisage members of different shapes.

Finally, it will be appreciated that the device described above is applicable to the heating rods of any type of pressuriser employed in nuclear reactors using pressurised water. Thus, while a pressuriser containing 60 heating rods has been described, in the case of nuclear reactors of higher power, pressurisers containing a large number of rods (for example 87) are used.

What is claimed is:

1. A entirely removable device for detachably fixing an elongate heating element, with an electrical resistance, which extends into the pressurizer of a nuclear reactor using pressurized water for heating the water in the primary circuit thereof and for keeping the water at constant pressure, the heating element extending inside a tubular sleeve which passes in a leaktight manner through the wall of the plate of the pressurizer, that end of the sleeve which is located outside the pressurizer being provided with a shoulder having two bearing faces extending perpendicular to the axis of the sleeve, the inner one of the bearing faces being directed towards the pressurizer, and the outer one of the bearing faces being directed outwardly thereof, said fixing device comprising an assembly of members having a symmetry of revolution and the axes coaxial with the axis common to the sleeve and to the heating rod, said members of said assembly comprising:

a collar which is adapted to be made integral with that end of the heating rod which is located outside the pressurizer, said collar having an inner face for bearing on the outer face of the shoulder of the sleeve with the interposition of gasket means for ensuring leaktightness between the rod and the sleeve to isolate the inside of the pressurizer from the external environment and an outer face;

a ring made of two identical parts delimited by a plane passing through said axis thereof, said ring being intended to bear on the inner face of the shoulder and having an external diameter which is greater than the external diameter of the shoulder and of said collar;

a nut comprising, from the outer end thereof intended to be located outwardly of the pressurizer to the inner end thereof closer to the pressurizer, a part of small internal diameter, which is bounded by a shoulder intended to bear on said outer face of said collar, a part of larger internal diameter, said diameter being greater than said external diameter of said ring, said part of larger internal diameter having an opening towards the outside for discharging leaking primary water and being arranged to be, in use, at the level of the join between said collar and the sleeve, and a cutting zone having a circumferential groove arranged to be, in use, at the level of said ring, and an internally threaded part; and a tubular collar having on its outer face a thread corresponding to the thread of said internally threaded part of said nut, an internal diameter which is greater than the external diameter of the shoulder of the sleeve but less than said external diameter of said ring on which said tubular collar is intended to bear, to allow removal of said tubular collar from said sleeve after removal of the two parts of said ring, free of cutting of said shoulder of said sleeve when said nut need be cut into two parts along said cutting zone.

* * * * *